April 4, 1944.                L. EDELMANN                2,345,921
                              THERMOHYDROMETER
                         Filed June 30, 1941           4 Sheets-Sheet 3
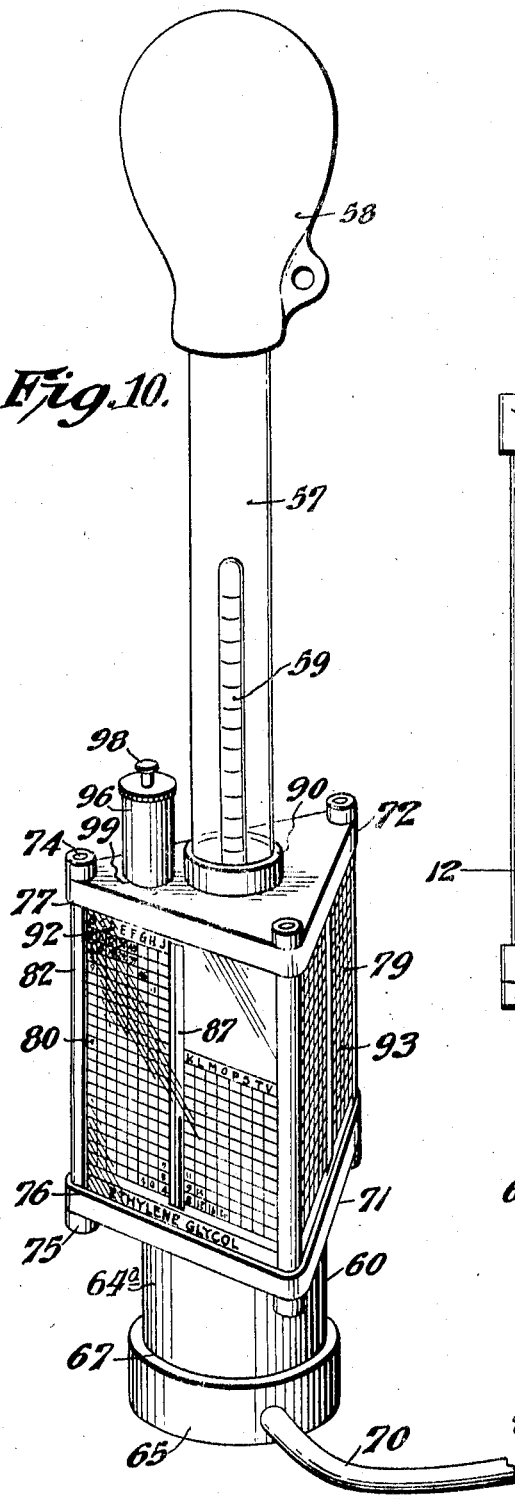
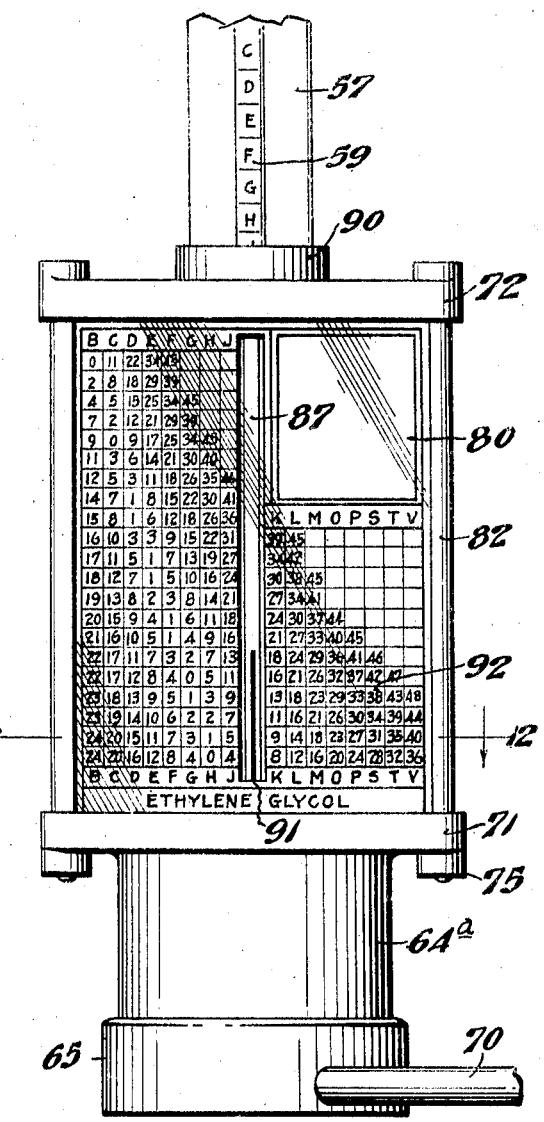
Inventor
Leo Edelmann
By Lloyd W. Patch
Attorney April 4, 1944.                L. EDELMANN                2,345,921
                            THERMOHYDROMETER
                         Filed June 30, 1941        4 Sheets-Sheet 4
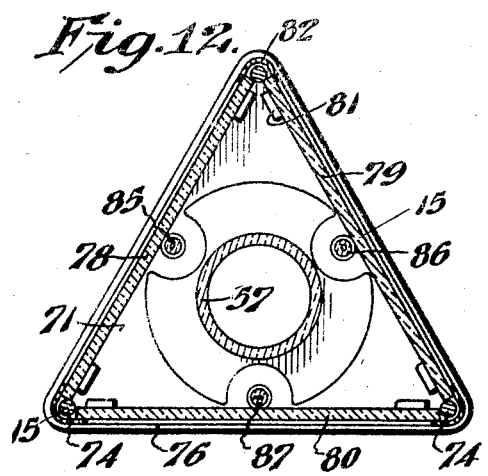
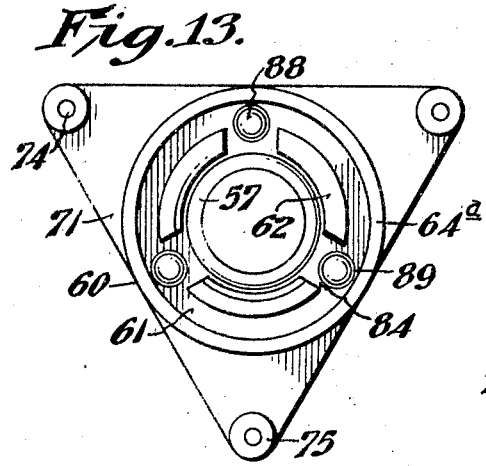
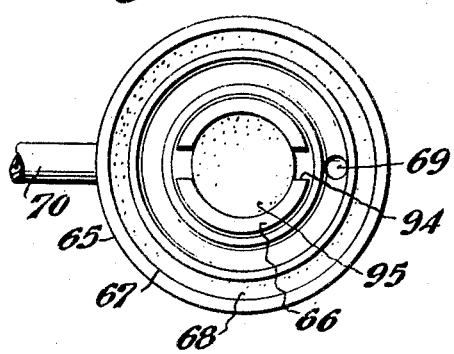
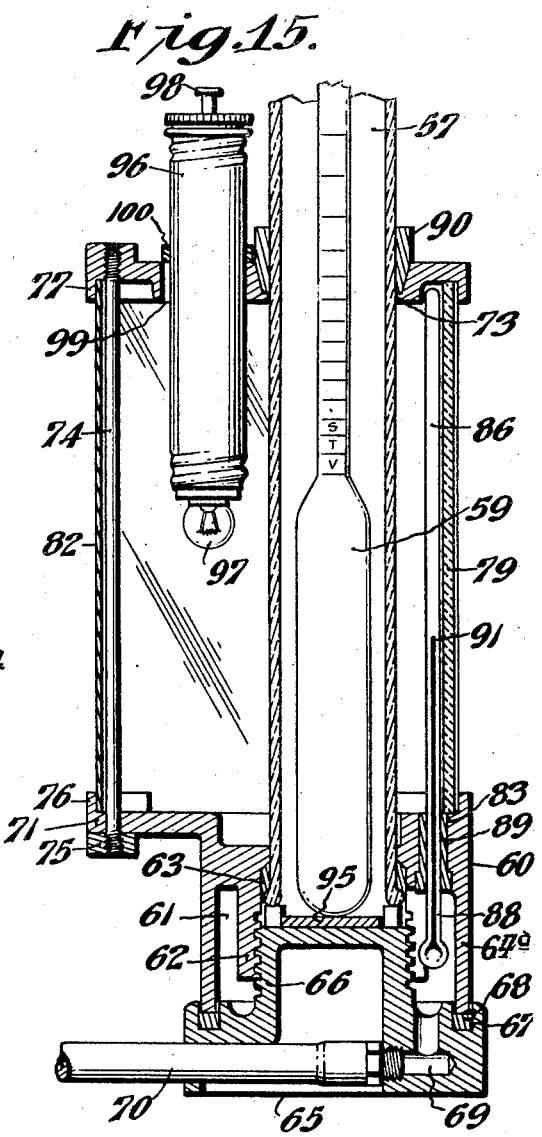
Inventor
Leo Edelmann
By Lloyd W. Baleh
Attorney Patented Apr. 4, 1944

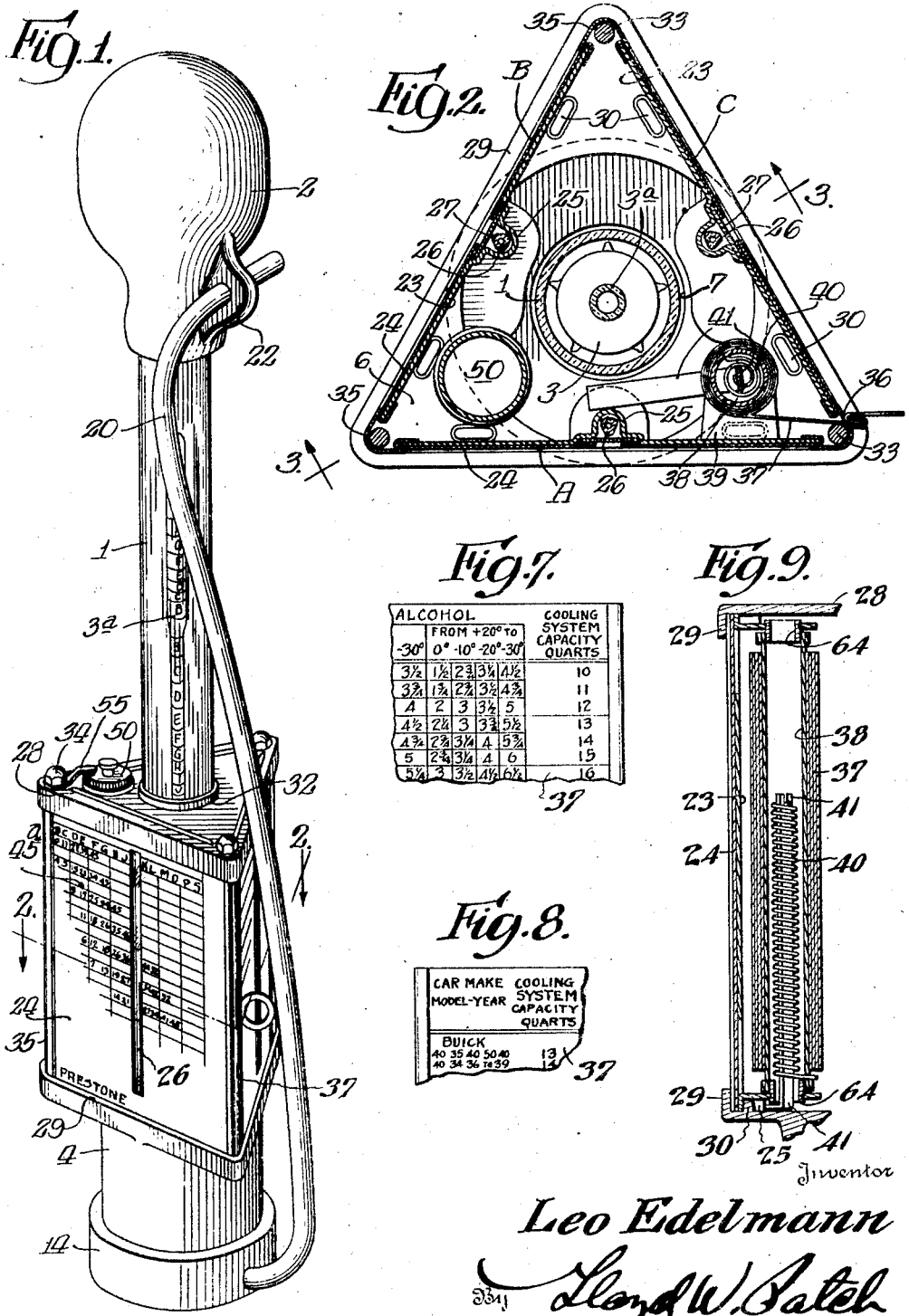

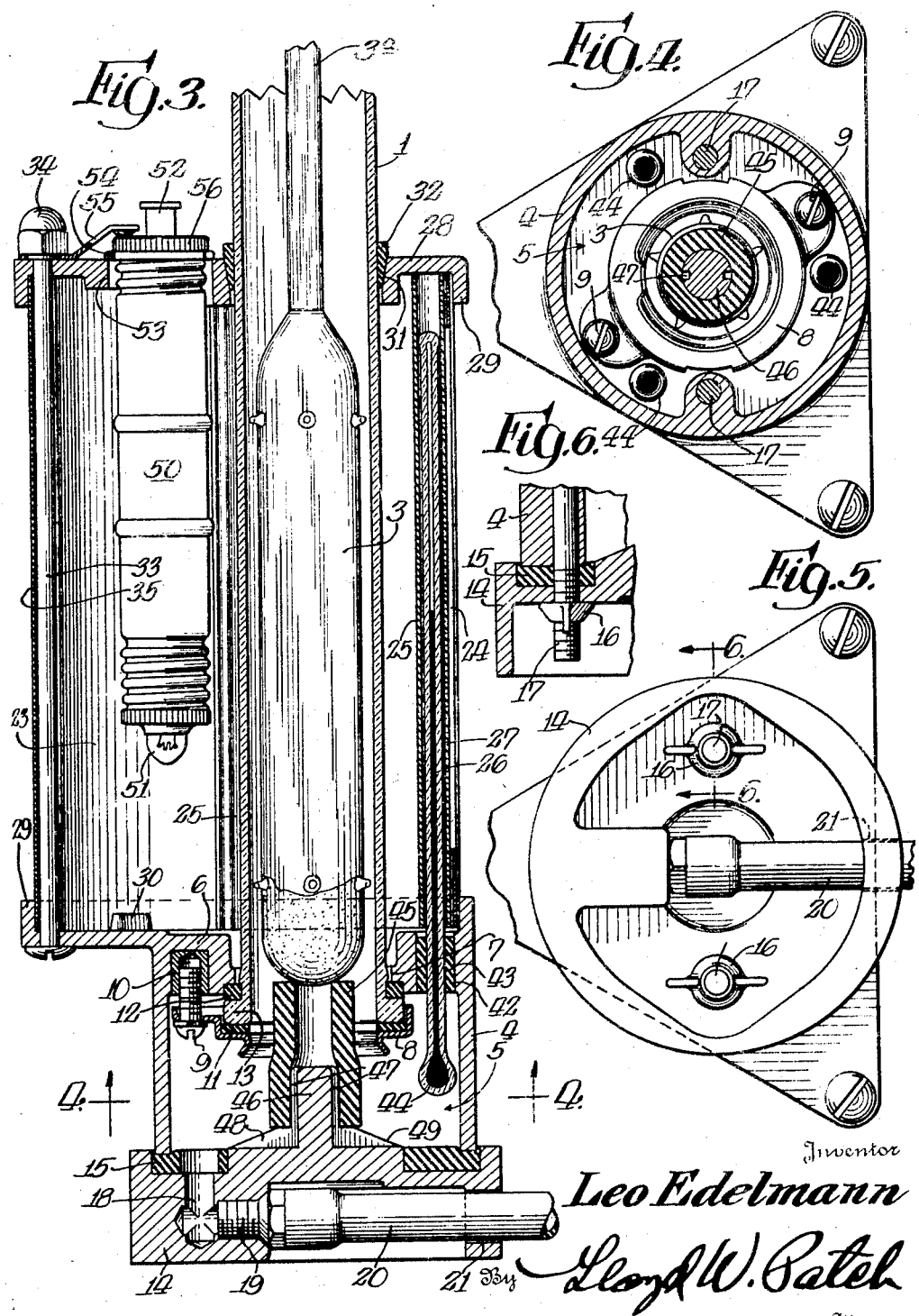

2,345,921

UNITED STATES PATENT OFFICE 2,345,921

THERMOHYDROMETER

Leo Edelmann, Chicago, Ill.

Application June 30, 1941, Serial No. 400,470

5 Claims. (Cl. 265—46)

My invention relates to improvements in thermo-hydrometers, and particularly to a device of this character intended and adapted for use in testing a plurality of liquid solutions having different specific gravities, such as radiator antifreeze solutions, and to provide temperature correction means immediately available for each solution.

An object of this invention is to provide a hydrometer comprising a liquid container having a specific gravity indicator capable of use with a plurality of liquid solutions, together with a correction scale or chart for each of the solutions to be tested and temperature responsive means for each of the scales having a temperature influenced portion thereof positioned to be influenced by the temperature of the liquid.

Another object is to so construct and associate the parts that the gravity indicating element and the particular correction scale for the solution being tested and the temperature responsive means adjacent to the correction scale can all be read in the same field of vision, with direct cross readings possible from the temperature responsive means to the correction scale.

Another purpose is to so construct the parts that my improved hydrometer is of simple and inexpensive construction, is substantially proof against error or confusion in use and reading, and has the parts thereof so made and assembled that the instrument will prove durable in use and there will be little likelihood of damage or breakage under conditions ordinarily encountered in use.

Yet a further object resides in providing a temperature correcting hydrometer structure such that the parts can be readily manufactured and can be assembled with facility into the completed and operative instrument.

Another object is to so construct the parts that the float element or specific gravity influenced means can be made or calibrated to the particular solutions with which the instrument is to be used, the main portions and the temperature influenced means can be constructed to be substantially identical for use with any and all solutions, and then the temperature correction scale display means can be selected for the particular liquid solutions, thus making it possible to use a single main construction for a great number of liquid solutions simply by employing a float element or specific gravity indicating means calibrated for the particular solution and a correction scale showing data or indicia based upon the particular solution and the peculiar characteristics thereof.

A still further object of my present invention is to provide a convenient chart for determining or calculating the quantity of additional solution to be added to a radiator or the like for correcting the specific gravity to that required for the radiator to stand a different temperature than the temperature it tests at, such chart being in the form of a compact roll within the instrument and readily unwound to a position for observation.

With the above and other objects in view, some of which will be apparent to those skilled in the art and other of which are inherent in the construction and use of the instrument, my invention includes certain novel features of construction and combinations and arrangements and associations of parts which will be hereinafter set forth in connection with the accompanying drawings, wherein:

Figure 1 is a perspective view showing an adaptation of my invention.

Fig. 2 is a horizontal sectional view on the line 2—2 of Figure 1 showing the parts on an enlarged scale.

Fig. 3 is a fragmentary vertical sectional view on the line 3—3 of Fig. 2.

Fig. 4 is a horizontal sectional view of the line 4—4 of Fig. 3.

Fig. 5 is a bottom plan view of my thermohydrometer.

Fig. 6 is a sectional view on line 6—6 of Fig. 5.

Fig. 7 is a fragmentary view of one side of a chart suitable for use with this instrument.

Fig. 8 is a fragmentary view of the reverse side of the chart.

Fig. 9 is a fragmentary vertical sectional view showing details of construction of the rolled chart.

Fig. 10 is a perspective view showing another and modified adaptation of my invention.

Fig. 11 is an enlarged fragmentary view in elevation looking at one side of the lower portion of the instrument shown in Figure 10.

Fig. 12 is a transverse horizontal sectional view substantially on line 12—12 of Fig. 11.

Fig. 13 is a view in bottom elevation with the end closure removed.

Fig. 14 is a view in top plan showing the end closure.

Fig. 15 is a fragmentary vertical sectional view substantially on line 15—15 of Fig. 12.

With the first illustrated embodiment of this invention as disclosed in the accompanying drawings, a liquid receiver or container or barrel 1 is shown as being a tubular barrel of glass or other transparent material, and at its upper end this container or barrel has a bulb 2 by which a test quantity of liquid is sucked into the instrument and is expelled therefrom. Obviously, the bulb 2 and the container 1 may be of any desired and suitable type or form, with the container preferably tubular shaped. Within the container or barrel a specific gravity indicating or float element 3 is contained, which also may be of any desired and suitable construction. The specific gravity indicating element 3 has a gauge stem 3a marked off and calibrated for use in testing two or more liquid solutions having different specific gravities, as for example different radiator anti-freeze solutions of specific gravity greater or less than water.

A lower casing member or extension housing 4 is provided, and this extension member has a liquid receiving space 5 communicating with the space within the liquid barrel 1 and serving as a part of the container or receiver for the test quantity of liquid. The extension casing member 4 is provided with a top wall 6 having an opening 7 therethrough, through which the barrel 1 extends. A retainer ring 8 of metal or other suitable material is provided for holding the barrel 1 assembled relative to the wall 6. This ring 8 is held in position by suitable screws 9 extending into threaded inserts 10 embedded in the extension housing 4, which housing may be of Bakelite, molded plastic, or the like. Packing rings 11 and 12 are interposed between an annular bead 13 on the lower end of the barrel 1 and parts 6 and 8 to establish a cushion and a liquid-tight connection between the barrel or container 1 and the extension housing 4.

A closing member 14 is provided for the lower open end of the housing 4. A gasket or packing 15 is interposed between the closing member 14 and the housing 4 to provide a liquid-tight connection. The closing member 14 is retained in position and the gasket 15 is compressed by a pair of wing nuts 16 mounted on threaded studs 17 extending from the housing member 4, as shown in Figures 5 and 6.

The closing member 14 has a liquid passageway 18 opening within the liquid space 5 when the closing member is in place. A liquid nozzle tip or nipple 19 is screwed into the passageway 18 and a nozzle tube 20 of rubber or the like is mounted thereon to communicate therewith. The nozzle tube 20 extends through an opening 21 in the closing member 14 to any desired and convenient length, and can be thrust through a perforated ear 22 of the bulb 2 when the instrument is not in use. The closing member 14 is presented as a broad and substantially flat base surface so that the instrument can be placed to rest or stand upon such surface to thus be supported or rested in upright or upstanding position for convenient use and reading for accomplishment of accurate testing results.

In the present instance, I have illustrated my invention embodied with a thermohydrometer adapted for use in testing three different solutions, or such number of solutions as can be accommodated on or by the use of three correction tables indicated generally at A, B and C. Each correction table comprises a backing sheet 23 and a table sheet 24. Each backing sheet has a longitudinal depression 25 adapted to receive a thermometer tube or the indicating portion of a thermometer 26. A transparent member 27 is interposed between each table sheet 24 and its corresponding thermometer tube 26.

The outline of the wall 6 of the housing 4 is substantially triangular or three-sided, when viewed in plan, to accommodate the three correction tables A, B and C. An upper wall or head 28, substantially corresponding in shape to wall 6, is provided with the correction tables A, B and C interposed between these walls 6 and 28. The walls 6 and 28 have peripheral flanges 29 adapted to keep the tables A, B and C in position in cooperation with lugs or stops 30 or other suitable means extending from the walls 6 and 28 and spaced from the flanges 29. The lugs or stops 30 serve to prevent inward displacement of the tables A, B and C, while flanges 29 prevent outward displacement.

The upper wall or head 28 is provided with a tapered opening 31 through which the barrel 1 extends and a gasket ring or a cushion member of rubber or the like 32 is interposed between the inner wall of the opening and the barrel to provide a seal and prevent undesirable shock or breakage at this point.

For retaining the correction charts A, B and C in assembled relation to the parts 6 and 28, I provide three tie rods 33 having clamp nuts 34. Angle-shaped trim or cover strips 35 are fitted at the angles of the triangular flanges 29 and embrace the edges of the tables A, B and C to enclose them, keep them in proper position and provide a neat-appearing and protected or covered structure. One of the cover strips 35 is provided with a slot indicated at 36 through which a wound or rolled correction chart 37 extends when unrolled or unwound.

The chart 37 is wound on a roller 38 journaled in a pair of bearings 64 mounted in perforated ears 39 extending from one of the backing sheets 23, or otherwise supported or mounted. The roller is urged to rotate in winding direction, clockwise in Figure 2, by a spring 40. One end of the spring is connected with the roller 38 and the other end is connected with an L-shaped lever 41 or is otherwise secured or anchored to hold said other end of the spring against rotation. The front side of the correction chart 37, as shown in Figure 7, can include and display data to indicate how many quarts of antifreeze solution should be added to strengthen or prepare or fortify the radiator solution so that it will withstand freezing from one degree as indicated to another desired lower degree of temperature, depending upon the capacity of the cooling system. The rear side of the correction chart 37, as shown in Figure 8, can be imprinted or otherwise marked to show the capacity of the cooling system of various automobiles or engines.

The extension casing 4 has three openings 42 formed in the upper wall 6 thereof and spaced around the opening 7 which receives the container or barrel 1. Within the openings 42, nipples or gasket members 43 are fitted and through the nipples the thermometer tubes 26 extend. The tubes 26 are shown as the capillary tube type of thermometer having bulb portions 44 located within the liquid space 5. The nipples 43 serve effectively to hold the thermometer tubes 26 in upright relation at proper adjustment and cushion the thermometers against shocks and breakage.

By printing or etching or fusing or the employment of transfers or decalcomanias, or in any other desired or suitable manner, I apply upon the sheet members 24 of the tables A, B and C, correction table or other indicating data as designated generally at 45a. Since the present thermohydrometer is designed for use in connection with solutions having different specific gravity or characteristics, the correction tables or indicating data will, of course, be of different and special character on each face as represented by the sheet or plate-like portions 24 thereof. For illustration, a correction table or indicating data is shown in Figure 1 as marked for use in testing "Prestone" anti-freeze solutions, and the other two sides can show data relating to methanol and denatured alcohol, while if desired, two charts may be provided on each correction table for additional solutions such as ethylene glycol, "Zerone," and other solutions. It is of course understood that the instrument is capable of adaptation and use with or for many liquid solutions, in which uses the correction table or data at 45a will be appropriately changed or shown. In each instance, the adjacent thermometer 26 is readily and clearly visible through the transparent element 27 and adjacent to the markings or indications on the correction table, and the two can be read in conjunction with each other.

The closing member 14 is provided with an upstanding stud or projection 46 centrally located, on which is positioned or mounted a short length of rubber tubing 45. The tubing 45 serves as a cushion member or rest to prevent breakage or damage to the float or specific gravity indicating element 3. Grooves 47 are formed in opposite sides of the stud 46 and grooves 48 are continuations of the grooves 47, the grooves 48 being formed in a cone-shaped base 49 of the stud 46. The grooves 47 and 48 permit passage of the solution being tested upwardly or downwardly through the tube 45.

The gauge stem of the float element 3 will of course be graduated and marked for the particular solutions to be tested and, as in the present instance, this gauge stem will have markings suitable to the three or more various solutions. The correction table data at 45a is compiled with respect to float element readings and temperature indications and the markings are here shown as in vertical and horizontal column arrangement or display. At the head of each vertical column, a character or indication is placed corresponding to an indication of the float gauge stem and the indicating column 26 of the thermometer will designate a horizontal column on the table data at 45a. Thus, by viewing the specific gravity indication and the temperature indication all in a single field of vision, a direct reading can be taken upon the particularly indicated or identified scale markings of table 45a to give desired data or information.

As liquid is taken into the instrument through the nozzle hose 20, the space 5 will be filled and the liquid will flow up into the container or barrel 1 to the height required for a test showing with the float element 3. It will thus be seen that each of the temperature indicating means is subjected to the test quantity of liquid at the temperature at which this liquid flows to the liquid container or barrel 1 containing the float element 3. Since the several temperature indicating means are influenced simultaneously, the user need only know what solution is being tested, and by simply turning the instrument so that the appropriate correction table A, B or C is visible, direct and substantially correct and immediate readings can be made.

After the hydrometer test is made, the back of the wound or rolled chart 37 (see Figure 8) can be consulted to determine the capacity of the cooling system of the car from which the test solution has been taken. Knowing the capacity, then the front of the wound or rolled sheet 37 (Figure 7) is consulted to determine how many quarts of anti-freeze solution should be added to bring the radiator solution to a point where it will withstand a desired atmospheric or surrounding temperature.

Since hydrometer instruments are often used in garages and other places or buildings where visibility is not good, it is desirable that means be provided for illuminating or lighting the various parts. In Figures 1, 2 and 3, I have shown one such means comprising a casing 50, such as a flashlight battery casing carrying a light bulb 51 at one end and a switch means 52 at the other end. An opening 53 is provided through the upper wall 28 so that the bulb end of the casing 50 can be inserted therethrough. A ring 54 or other suitable means prevents the casing 50 from dropping entirely through the opening 53 and a clip 55 pivoted on one of the tie rod nuts 34 or otherwise swingably mounted serves, when swung to registry and engagement with a top member 56 of the casing 50, to retain the flashlight in position until it is desirable to remove and use it. The interior of the casing formed by the walls 6 and 28 and the table members A, B and C may house accessories other than the wound or rolled chart 37 and the flashlight 50, if deisred.

With the modified embodiment of the invention illustrated in Figures 10 to 15, inclusive, the liquid receiver or container or barrel 57 is shown as being a tubular barrel of glass or other transparent material, and at its upper end this container or barrel has a bulb 58 by which a test quantity of liquid is sucked into the instrument and is expelled therefrom. Obviously, this bulb 58 and the container 57 can be of any desired and suitable type or form, and the specific gravity indicating or float element 59, within the barrel or container 57, can also be of any desired and suitable construction.

A lower casing member 60 fitted around the lower end of the barrel portion 57 has a liquid receiving space 61 communicating with the space of the liquid barrel and serving as a part of the container or receiver for the test quantity of liquid. This lower casing member 60 is provided with an internally screw threaded inner sleeve portion 62 adapted to receive the lower end of the barrel 57 and a packing 63 is interposed to establish a cushion and a liquid-tight connection between the casing member 60 and the barrel 57. The outer sleeve-like wall 64—a of the casing member 60 is spaced somewhat from the sleeve 62, and thus the liquid receiving space 61 is substantially annular.

A closing member 65 is provided with an upstanding externally screw threaded portion 66 adapted to fit and screw within the sleeve 62, and around this screw threaded portion 66 the closing member 65 is provided with an annular recess 67 containing a packing 68 against which the outer end of the sleeve-like wall 64—a engages to close the space 61 to be liquid-tight. The upstanding extension 66 is adapted to engage at its inner end with the lower end of the liquid container or barrel 57 and exerts sufficient force to close the barrel against the packing 63 to establish a liquid-tight connection. The closing member 65 has a liquid passage 69 opening within the space 61 when the closing member is in place, and a liquid nozzle tip or housing 70 is connected with the passage.

In this adaptation I have illustrated my invention embodied with a thermohydrometer adapted for use in testing three different solutions, or such solutions as can be accommodated on or by the use of three correction tables, and the lower casing member 60 is consequently provided at its upper end with an extending flange 71 made or shaped or formed to be substantially three-sided or triangular when viewed in plan. An upper casing member 72 of size and shape similar to this flange 71 is provided with an opening 73 whereby the upper casing member 72 can be fitted over or upon the container or barrel member 57. The flange 71 and the upper casing member 72 are, in use, located in spaced relation, and connecting rods 74 are fitted in and through suitable openings in the portions 71 and 72 and connecting nuts 75 are provided on these rods for holding the upper and lower casing members in assembled relation.

The opposed faces of the flange portion 71 and the upper casing member 72 have flange portions 76 and 77 adapted to receive the plate or sheet-like members 78, 79 and 80, lugs or stops 81, or other suitable means, being provided on these portions 71 and 72 inwardly spaced from the flange portions 76 and 77, to hold the plate or sheet-like members against inward displacement. If desired, trim or cover strips 82 can be provided to cover the edges of the plate or sheet-like members 78, 79 and 80, and in the present instance I have shown these members 82 as also covering the connecting rods 74. If desired, the members 82 can be constructed to serve or function as spacers between the portions 71 and 72, where the sheet or plate-like members 78, 79 and 80 are of glass or other material that might be damaged or bent or distorted by exertion of holding contact.

The lower casing member 60 has openings 83 formed therethrough around the opening receiving the container or barrel 57, and these openings are preferably located adjacent to and substantially centrally of the inner sides of the plate or sheet-like members 78, 79 and 80.

The internally screw threaded sleeve portion 62 is recessed or cut away, as at 84, adjacent to each opening 83, as shown in Fig. 13. Temperature influenced and responsive means, in the present instance shown as capillary tube thermometers 85, 86 and 87, are fitted through the openings 83 with their lower or bulb portions 88 located within the liquid space 61 and accommodated within the recesses 84, and these thermometers have the indicating portions extending upwardly in proximity to the separate plate or sheet-like members 78, 79 and 80. Sleeve or gasket members 89 are fitted within the openings 83 to establish liquid-tight connections and thus prevent escape of liquid from the space 61. At the same time these sleeve or gasket members serve effectively to hold the thermometer tubes in upright relation at proper adjustment, and cushion the thermometers against shocks and breakage.

A gasket ring or cushion member 90 can be provided between the upper casing member 72 and the liquid container or barrel 57, and the parts can be cushioned and protected at any other desired or necessary point.

In the present instance I have shown glass or transparent plates at 78, 79 and 80, and where clear glass is employed the indicating columns 91 of the respective thermometers 85, 86 and 87 can be clearly and freely viewed through the glass plates. By printing or etching or fusing or the employment of transfers or decalcomanias, or in any other desired or suitable manner, I apply upon the plate or sheet-like members 78 and 79 and 80, correction table or other indicating data, as generally designated at 92. Since the present thermohydrometer is designed for use in connection with solutions having different characteristics, the correction tables or indicating data will of course be of different and special character on each face as represented by the sheet or plate-like portions 78 and 79 and 80. For illustration, a correction table or indicating data is shown in Fig. 11 as marked for use in testing ethylene glycol, and the other two sides can show data relating to methanol and to denatured alcohol, it of course being understood that the instrument is capable of adaptation and use with or for many liquid solutions, in which uses the correction table or data at 92 will be appropriately changed or shown. Thus, while the correction table or face at 92, in Figure 10, is designated for ethylene glycol, the face at 93 can be for use in testing methanol, and the third face can display matter for testing denatured alcohol. In each instance, the adjacent thermometer is readily and clearly visible through and adjacent to the markings or indications on the correction scale, and the indicating column 91 can be read in connection with such data.

The recesses 84 through the sleeve will permit free flow of liquid from the space 61 into the interior of the sleeve, and the upstanding extension is provided with one or more recesses 94 so that direct liquid communication is established between the space 61 and the liquid container or barrel 57. A cushion disk or member 95 can be provided on the head of the extension 66 to prevent breakage of or damage to the float 59.

The gauge stem of the float element 59 will of course be graduated and marked for the particular solutions to be tested, and as in the present instance, this gauge stem will have markings suitable to the three various solutions. The correction table data at 92 is compiled with respect to float element readings and temperature indications, and the markings are here shown as in vertical and horizontal columnar arrangement or display. At the head of each vertical column a character or indication is placed corresponding to an indication of the float gauge stem, and the indicating column 91 of the thermometer will designate a horizontal column. Thus, by viewing the specific gravity indication and the temperature indication a direct reading can be taken upon the scale markings at 92 to give desired data or information. As liquid is taken into the instrument through the nozzle tip portion 70 the space 61 will be filled and the liquid will flow up into the container or barrel 57 to the height required for a test showing with the float element 59, and it will thus be seen that each of the temperature indicating means is subjected to the test quantity of liquid at a temperature at which this liquid flows to the liquid container or barrel 57 containing the float element 59. Since the several temperature indicating means are influenced simultaneously, the user need only know what solution is being tested, and by turning the instrument so that the corresponding correction scale or data showing is visible, correct and immediate readings can be made.

Obviously, the members 78 and 79 and 80 can be made of sheet metal or of any suitable material, and where the material is not readily transparent, openings or viewing spaces may be provided adjacent to the several temperature indicating means 85 and 86 and 87

In garages and in other places where visibility is not good, it is desirable that means be provided for illuminating or lighting the various parts. In Figs. 10 and 15 I have shown one such means, and here a casing 96, such as a flashlight battery casing, carries a light bulb 97 at one end and has switch means 98 at the other end. An opening 99 is provided through the upper casing member 72 so that the bulb end of this casing 96 can be inserted therethrough, and in this adaptation when the switch 98 is closed the light bulb 97 will emanate light to illuminate the temperature indicating means and the float means, and in the case of transparent or translucent members at 78 and 79 and 80 the indications at 92 will be illuminated. The casing 96 may be made to support the lamp bulb 97 at any desired elevation within the casing structure, and in the present instance an adjustable band or stop 100 is shown so that the location of the light bulb can be varied. Where the members 78, 79 and 80 are opaque or the indications at 92 cannot be otherwise readily lighted by interior illumination, it may be desirable to have external illumination, and consequently the casing 96 and the lamp structure can then be removed for external use, to be returned and housed within the casing when not in use or for internal illumination.

While I have herein shown and described only certain specific embodiments and have suggested only certain possible changes in the construction and materials and the like, it will be appreciated that many changes and variations can be resorted to without departing from the spirit and scope of my invention.

I claim:

1. A thermohydrometer adapted for use in testing a plurality of liquid solutions having different specific gravity characteristics comprising a liquid and float receiving barrel, a float element in said barrel, a suction bulb at the upper end of said barrel, an extension housing at the lower end of said barrel of greater diametral extent than said barrel having a liquid chamber therein and provided with a liquid inlet thereto, a polygonally shaped head on the upper portion of said extension housing, said extension housing having an opening through the top thereof into the liquid chamber at a point medially of one of the flat sides of said polygonal head, a thermometer mounted in said opening with temperature influenced portion exposed within the liquid chamber and an indicating portion extending up alongside of the barrel, a second polygonal head around said barrel spaced upwardly from the first-mentioned head, said polygonal heads having marginal grooves in the opposed faces thereof, scale carrying panels fitted in said grooves and between the two heads with one of said panels disposed adjacent to the indicating portion of the thermometer, and bolts drawing said heads together to retain said panels in place.

2. A thermohydrometer adapted for use in testing a plurality of liquid solutions having different specific gravity characteristics comprising a tubular liquid and float receiving barrel, a tubular extension housing of greater diameter than said barrel provided with an opening for reception of one end of the barrel, means mounting the end of the barrel in liquid-tight fit within the opening, a closure for the bottom of said extension housing having a liquid passage communicating with a liquid chamber within the extension housing, said extension housing having a widened head of polygonal form at the upper end thereof and being provided with an opening through its top spaced outwardly from the opening in which the liquid barrel is received and substantially centered with respect to one of the straight sides of the polygonal head form, a polygonal head of similar shape received around said barrel and spaced above the polygonal head of the extension housing, a thermometer mounted in liquid-tight fit within the opening with a temperature influenced portion within the liquid chamber of the extension housing and an indicating portion extending up alongside of the liquid barrel, said two polygonal heads having marginal grooves on the opposed faces thereof, scale carrying panels fitted within said marginal grooves with one of said panels disposed adjacent to and extending on opposite sides of the indicating portion of the thermometer, and bolts passing through the corners of said two polygonal heads for drawing said heads together and securing said panels in place.

3. A thermohydrometer comprising a liquid and float receiving barrel, a float element in said barrel, a suction bulb at the upper end of the barrel, an extension housing at the lower end of the barrel provided with a liquid chamber in communication with the barrel and having a liquid inlet and outlet passage, a polygonally-shaped head on the upper portion of said extension housing, a second polygonal head around said barrel spaced upwardly from the head on the extension housing, panels fitted between the opposed faces of the two heads, tie rods connecting the two heads together and retaining said panels in place therebetween, said extension housing having an opening therethrough into the liquid chamber in proximity to one of the panels, and a thermometer fitted in the opening and having an indicating portion adjacent to the proximate panel.

4. A thermohydrometer comprising a liquid and float receiving barrel, a float element in said barrel, a suction bulb at the upper end of the barrel, an extension housing at the lower end of the barrel having a liquid chamber in communication with said barrel and provided with a liquid intake and discharge passage, a substantially triangularly shaped head around the upper portion of said extension housing, a second substantially triangularly shaped head around said barrel spaced upwardly from the head on the extension housing, said heads on their opposed faces being provided with panel-receiving recesses, panels fitted between the opposed faces of the two heads, tie bolts connecting the two heads together and retaining said panels in place therebetween, said extension housing having an opening therethrough into the liquid chamber in proximity to one of the panels, and a thermometer fitted in the opening and having an indicating portion adjacent to the proximate panel.

5. A thermohydrometer having a cylindrical liquid receiving barrel and including a prismatic housing member enclosing the lower end of the barrel, said housing including a pair of polygonal end walls having central circular openings through which the barrel passes, means within the housing for supporting a spring roller in the angular junction between two side walls of the housing, a flexible sheet normally wound upon the roller and extensible from the housing through a slot formed in the angle thereof in which the roller is positioned, the said sheet and the sides of the housing being provided with data for use in interpreting the readings of the thermohydrometer.

LEO EDELMANN.